(12) United States Patent
Yeung et al.

(10) Patent No.: US 8,098,959 B2
(45) Date of Patent: Jan. 17, 2012

(54) METHOD AND SYSTEM FOR FRAME ROTATION WITHIN A JPEG COMPRESSED PIPELINE

(75) Inventors: Clifford Yeung, San Jose, CA (US); Sheng Lin, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 727 days.

(21) Appl. No.: 12/260,619

(22) Filed: Oct. 29, 2008

(65) Prior Publication Data

US 2010/0104221 A1    Apr. 29, 2010

(51) Int. Cl.
*G06K 9/36*    (2006.01)
*G06T 3/60*    (2006.01)

(52) U.S. Cl. ........................ 382/297; 345/658

(58) Field of Classification Search .................. 382/248, 382/250, 296, 297; 345/649, 656, 658
See application file for complete search history.

(56) References Cited

U.S. PATENT DOCUMENTS

| | | | |
|---|---|---|---|
| 5,751,865 A | 5/1998 | Micco et al. | 382/296 |
| 5,867,598 A | 2/1999 | de Queiroz | 382/235 |
| 6,819,803 B2 * | 11/2004 | Mitchell et al. | 382/245 |
| 7,372,469 B2 * | 5/2008 | Chou | 345/591 |
| 2003/0039406 A1 * | 2/2003 | Chapin et al. | 382/296 |
| 2006/0104543 A1 | 5/2006 | Schweng | 382/297 |
| 2007/0009181 A1 * | 1/2007 | Leung et al. | 382/296 |
| 2007/0019005 A1 | 1/2007 | van Baarsen et al. | 345/649 |
| 2007/0165955 A1 | 7/2007 | Hwang et al. | 382/232 |

* cited by examiner

*Primary Examiner* — Andrew W Johns

(57) ABSTRACT

A system and methods for rotating and compressing digital image data is presented. The system includes an image sensor that vertically and horizontally flips a digital image, an image processor that converts the image into the YCbCr color space, reorder buffers that divide the YCbCr component data into component blocks and rotate the component blocks, and a JPEG encoder that applies JPEG compression to the rotated component blocks. The JPEG encoder differentially encodes DC coefficients of the component blocks in an order that corresponds to the desired rotated image. An index is created by the JPEG encoder that allows for the reconstruction and storing of the rotated component blocks as a rotated JPEG image.

37 Claims, 14 Drawing Sheets

| R | G |
|---|---|
| G | B |

NO FLIP

FIG. 7A

| G | R |
|---|---|
| B | G |

HORIZONTAL FLIP

FIG. 7B

| G | B |
|---|---|
| R | G |

VERTICAL FLIP

FIG. 7C

| B | G |
|---|---|
| G | R |

HORIZONTAL & VERTICAL FLIP

FIG. 7D

0 DEGREE, NO FLIP, READ MODE 1

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

FIG. 8A

90 DEGREE, H & V FLIPS, READ MODE 2

| 64 | 63 | 62 | 61 | 60 | 59 | 58 | 57 |
|---|---|---|---|---|---|---|---|
| 56 | 55 | 54 | 53 | 52 | 51 | 50 | 49 |
| 48 | 47 | 46 | 45 | 44 | 43 | 42 | 41 |
| 40 | 39 | 38 | 37 | 36 | 35 | 34 | 33 |
| 32 | 31 | 30 | 29 | 28 | 27 | 26 | 25 |
| 24 | 23 | 22 | 21 | 20 | 19 | 18 | 17 |
| 16 | 15 | 14 | 13 | 12 | 11 | 10 | 9 |
| 8 | 7 | 6 | 5 | 4 | 3 | 2 | 1 |

FIG. 8B

270 DEGREE, NO FLIP, READ MODE 2

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

FIG. 8C

180 DEGREE, H & V FLIPS, READ MODE 1

| 64 | 63 | 62 | 61 | 60 | 59 | 58 | 57 |
|---|---|---|---|---|---|---|---|
| 56 | 55 | 54 | 53 | 52 | 51 | 50 | 49 |
| 48 | 47 | 46 | 45 | 44 | 43 | 42 | 41 |
| 40 | 39 | 38 | 37 | 36 | 35 | 34 | 33 |
| 32 | 31 | 30 | 29 | 28 | 27 | 26 | 25 |
| 24 | 23 | 22 | 21 | 20 | 19 | 18 | 17 |
| 16 | 15 | 14 | 13 | 12 | 11 | 10 | 9 |
| 8 | 7 | 6 | 5 | 4 | 3 | 2 | 1 |

FIG. 8D

METHOD AND SYSTEM FOR FRAME ROTATION WITHIN A JPEG COMPRESSED PIPELINE

FIELD OF THE INVENTION

The disclosure relates generally to the compression of image data, and more particularly to the rotation of the image data within a JPEG compression pipeline.

BACKGROUND OF THE INVENTION

Images captured by an image sensor are often stored in compressed form. One such standard compression technique includes the use of a discrete cosine transform (DCT) in accordance with the Joint Photographic Experts Group (JPEG) standard. Images stored using the JPEG compression standard are referred to as JPEG compressed images. Image compression using the JPEG standard is well known.

JPEG compression is a lossy compression scheme, meaning that compression of an image using the JPEG standard results in some data being irretrievably lost. The loss of data is controlled so that, in most cases, the human eye does not perceive the loss that results from an initial JPEG compression. However, each time a JPEG compressed image is decompressed for editing purposes, for example, and then resaved using JPEG compression, the image is recompressed. Recompression results in additional data being irretrievably lost. Multiple JPEG compressions of an image result in noticeable irregularities in the image. Currently, there is much emphasis on developing methods and systems for the lossless editing of JPEG compressed images, thus resulting in image editing that does not require decompression and subsequent recompression.

One type of editing action which is often performed by using JPEG decompression and recompression is the rotation of a JPEG compressed image. A conventional approach to rotating JPEG compressed images requires decompressing the JPEG compressed image into a bitmap, rotating the resulting bitmap, and then recompressing the rotated image into a JPEG compressed image. However, as explained above, the act of recompressing the image results in a noticeable degradation in the quality of the image. This process also requires significant memory storage and memory bandwidth.

Another method for rotating an image is to rotate the image before the image is JPEG compressed. Traditionally, this requires storing the image data as a bitmap and then using a separate buffer memory for remapping the image data. Like the JPEG decompression/compression method explained above, this method also requires significant memory storage and memory bandwidth.

Therefore, there is a desire and a need for methods and systems that facilitate the rotation of image data without requiring full-size memory buffers and JPEG decompression and recompression.

BRIEF DESCRIPTION OF THE DRAWINGS

FIGS. 7A-7D illustrate rotated Bayer patterns.

FIGS. 8A-8D illustrate reorder buffer read-out patterns according to a disclosed embodiment.

DETAILED DESCRIPTION OF THE INVENTION

A system and method for rotating digital images is described below. The rotation of images is described in the context of image acquisition wherein an acquired image is to be rotated. For example, the disclosed system and method allow images being acquired by, for example, a digital still-image camera to be rotated within a JPEG compression pipeline.

Figure 1A:
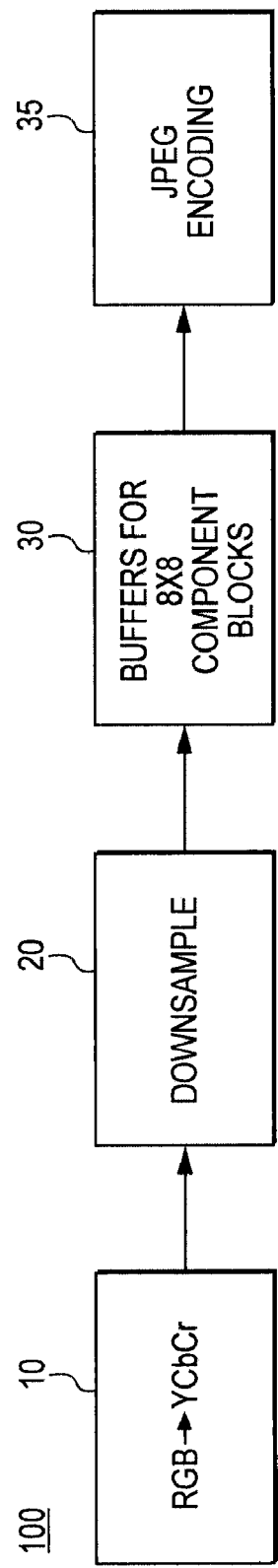
FIGS. 1A and 1B are block diagrams of a conventional JPEG compression pipeline.

Before discussing the disclosed system in detail, however, a brief summary of the details of JPEG compression is presented with reference to the JPEG compression pipeline 100 of FIG. 1A. Generally, the first step in compressing an image using the JPEG standard is to convert the image into the luminance/chrominance (YCbCr) color space (block 10 of FIG. 1A). The YCbCr color space has three components. The Y component is the luma component and represents the brightness of a pixel. The Cb and Cr components are the blue difference and red difference chroma components, respectively, and represent the color of the pixel. Because the YCbCr color space more closely represents the way humans perceive images, pixels encoded in the YCbCr color space can be compressed in a way that reflects human visual sensitivities.

Human vision is more sensitive to brightness than color, due to a greater density of brightness-sensitive receptors in the human eye than color-sensitive receptors. To take advantage of this, the YCbCr translated image may be downsampled so as to reduce the spatial resolution of the chroma components (block 20 of FIG. 1A). The ratios at which the downsampling occurs in the JPEG standard are 4:4:4 (no downsampling), 4:2:2 (the chroma components are reduced by a factor of two in the horizontal direction), and 4:2:0 (the chroma components are reduced by a factor of two in both the horizontal and vertical directions). Once downsampling is complete, the remaining Y, Cb and Cr components are processed as separate channels for the remainder of the JPEG encoding, as described below.

Figure 2:
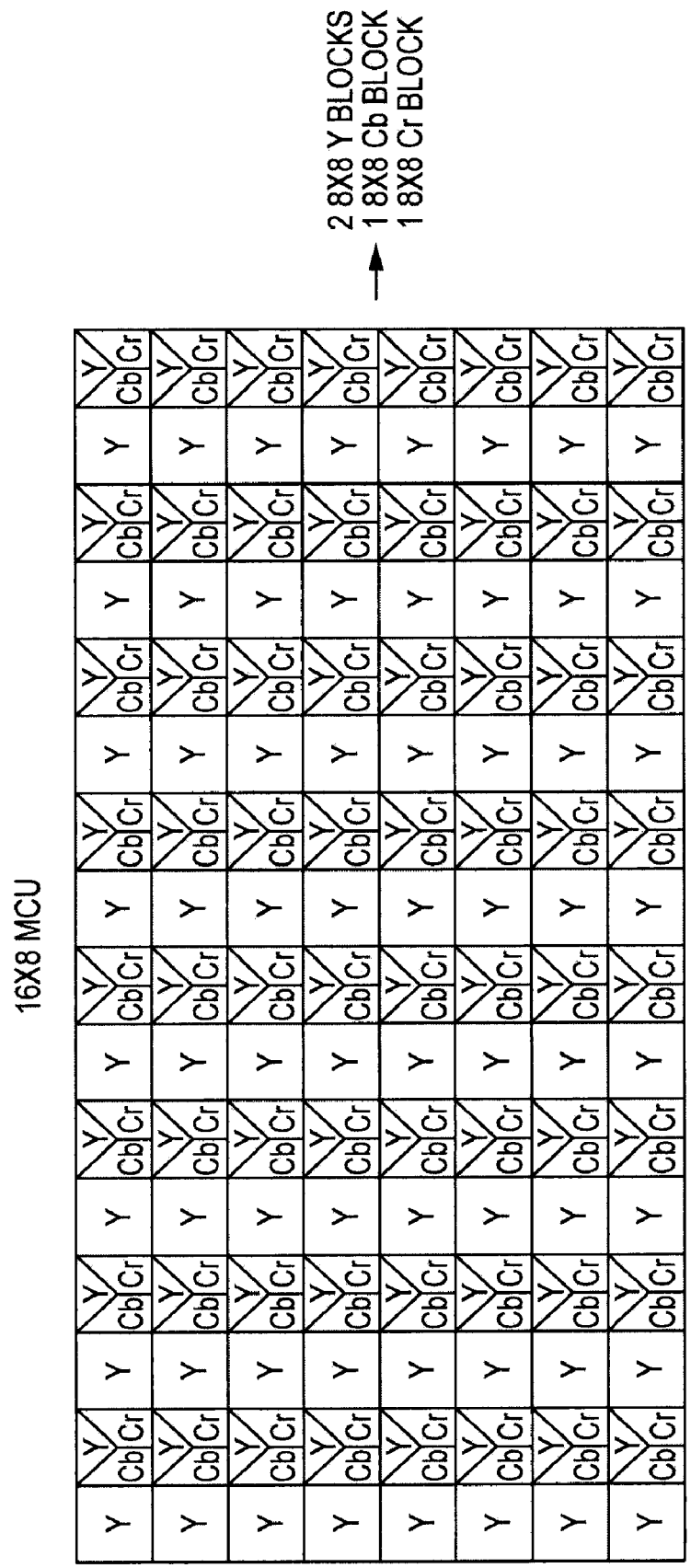
FIG. 2 illustrates a conventional 4:2:2 downsampling ratio scheme.

After downsampling, each channel is split into a number of smaller pixel blocks which are each independently encoded (block 30 of FIG. 1A). Corresponding pixel blocks from each channel are bundled as Minimum Coded Units (MCUs). If the chroma components are downsampled, more than one Y component value pixel block is necessary within each MCU to correspond with each of the chroma component pixel blocks, as is illustrated in FIG. 2. In FIG. 2, a 4:2:2 downsampling ratio scheme is illustrated. Because of downsampling, an 8×8 Cb or Cr component pixel block corresponds to a 16×8 image pixel block. However, because the Y component is not downsampled, two 8×8 Y component pixel blocks are required to correspond with the same 16×8 image pixel block for which only one 8×8 Cb component pixel block and one 8×8 Cr component pixel block is required. Thus, in a 4:2:2 downsampling ratio scheme, an MCU includes two 8×8 Y component pixel blocks, one 8×8 Cb component pixel block, and one 8×8 Cr component pixel block, together representing a 16×8 image pixel block. Similarly, in a 4:2:0 downsampling ratio scheme (not illustrated), an MCU includes four 8×8 Y component pixel blocks, one 8×8 Cb component pixel block, and one 8×8 Cr component pixel block, together representing a 16×16 image pixel block. Although the component pixel blocks in an MCU are each 8×8 pixels, the size of the MCU is determined by the dimensions of the image pixel block that is represented by the component pixel blocks. Therefore, for this reason, the MCU is dimensioned as either an 8×8, 16×8 or 16×16 pixel block.

Each MCU block must be complete. Therefore, if the data for a channel does not represent an integer number of MCU blocks, then additional dummy data is used to fill-in any incomplete blocks. As an example illustrated in FIG. 3, an image A of dimensions 64×40 pixels completely fills an array of 16×8 MCUs. The MCUs are represented by pairs of 8×8 blocks 1-40. Blocks 1 and 2 of image A are an MCU. Blocks 3 and 4 of image A are an MCU. Blocks 5 and 6 of image A are an MCU. Blocks 7 and 8 of image A are an MCU. However, an image B of dimensions 40×64 (e.g., a 64×40 pixel image that has been rotated 90°) cannot completely fill an array of 16×8 MCUs. In this case, a total of three 16×8 MCUs across the image are used, with the third MCU being appropriately filled with dummy data. For example, blocks 33 and 25 of image B are an MCU, and blocks 17 and 9 of image B are an MCU. Block 1 of image B must be paired with an additional block filled with dummy data.

Figure 1B:
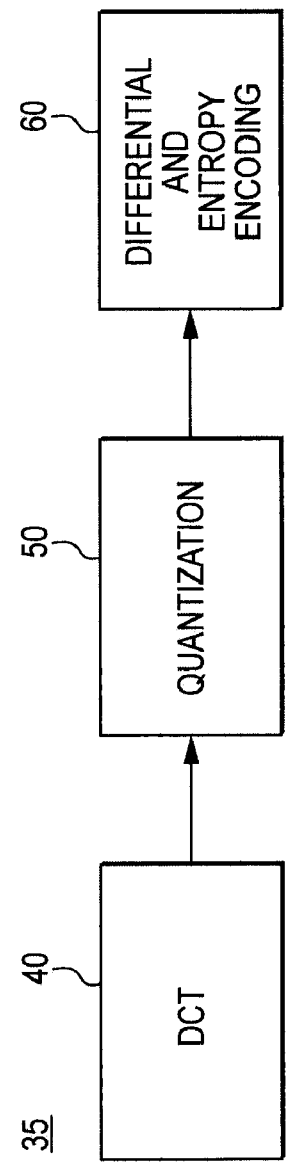

Referring again to FIG. 1A, the 8×8 component pixel blocks in the MCUs representing an 8×8, 16×8 or 16×16 block of pixels in the image are input to a JPEG encoder 35. Some of the actions of the JPEG encoder 35 are illustrated in FIG. 1B. The 8×8 component pixel blocks are subjected to a discrete cosine transformation ("DCT") (block 40 of FIG. 1B). As a result of the DCT applied to each component pixel block, each component pixel block is represented by an 8×8 array of DCT coefficients that include a single DC or zero-frequency coefficient and multiple higher frequency coefficients. The coefficient arrays are quantized or scaled (block 50 of FIG. 1B) and then converted into a bitstream to be differentially and entropy encoded (block 60 of FIG. 1B). The DC coefficients of the component pixel blocks are differentially and entropy encoded. In differential encoding, previously encoded data is used to predict the value of subsequently encoded data. Entropy coding encodes frequently occurring bitstreams with symbols that require less memory. One example of entropy coding is Huffman encoding.

Crucial to the success, however, of differential encoding is that all previously encoded data in the bitstream be encoded correctly, since proper encoding is contingent upon previously encoded data. In other words, if an error occurs in the encoding of data, all subsequently encoded data using the erroneous data as a prediction will be corrupted. For this reason, resynchronization codes are introduced into the data stream. The placement of resynchronization codes resets the differential encoding process so that encoding can start after a resynchronization code without any knowledge of previous encoded data. Such resynchronization codes are called restart markers in the JPEG standard. Restart markers are inserted into a compressed bitstream periodically once per restart interval, which is a predefined number of MCUs.

As an example, the restart interval could be four, meaning that after every set of four encoded MCUs, the differential encoding is restarted. Other restart intervals may be used. The minimum restart interval is one MCU. With a restart interval of one, the prediction value for each Cb and Cr component pixel block is always reset. But, for MCUs with multiple Y component pixel blocks (e.g., in 4:2:2 or 4:2:0 downsampling ratio schemes), the second, third or fourth Y component pixel block in the MCU will require a prediction value from the previously encoded Y component pixel block.

Figure 3:
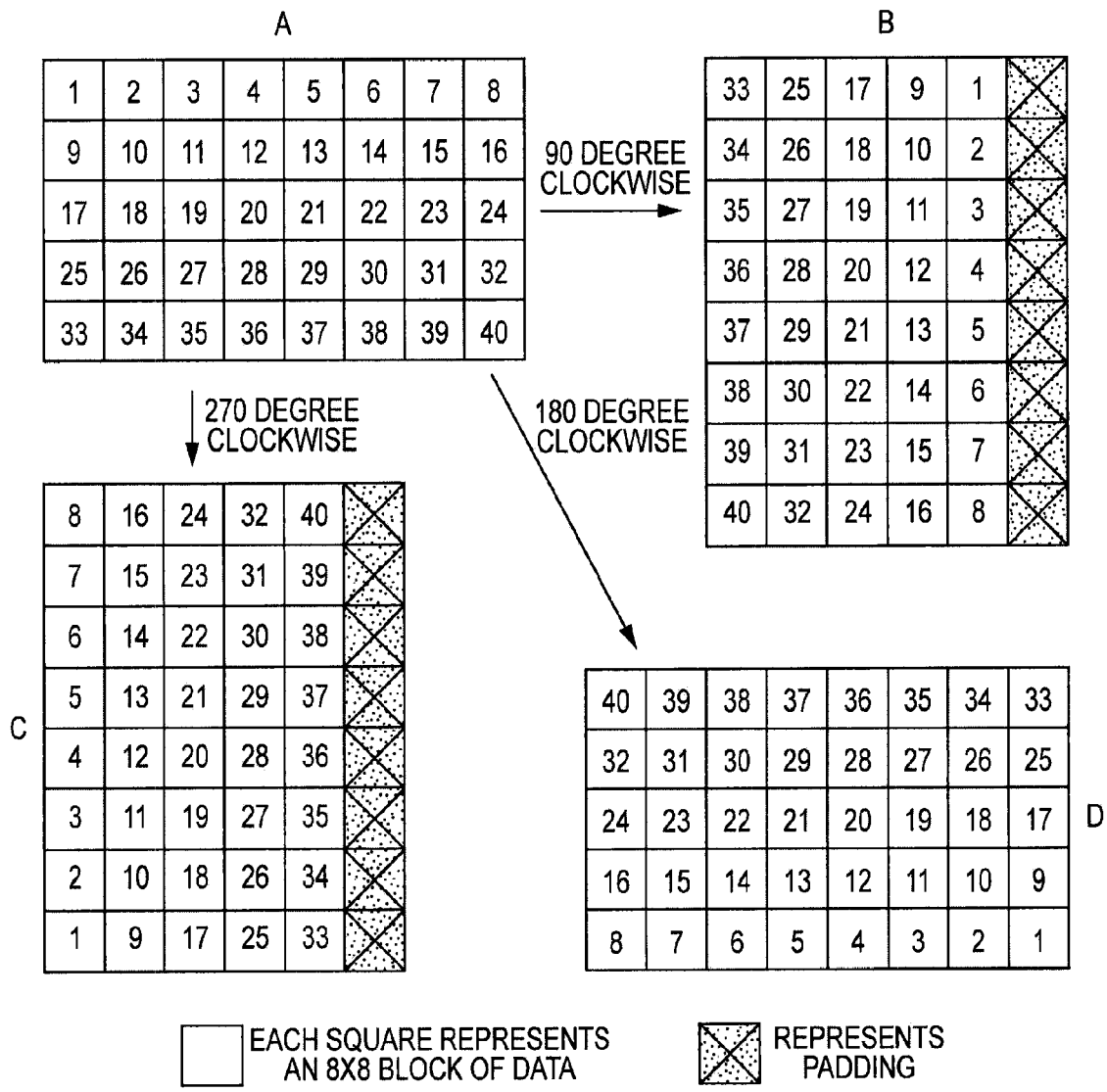
FIG. 3 illustrates image data organized in 8×8 blocks of data.

When JPEG compression involving 4:2:2 downsampling is used (resulting in 16×8 MCUs), image rotation becomes non-trivial. When a 4:2:2 JPEG compressed image is rotated, the MCUs in a pre-rotated image and in a post-rotated image include different component pixel blocks. This problem is illustrated in FIG. 3. FIG. 3 illustrates a 64×40 pixel image A that has been divided into 8×8 Y component pixel blocks 1-40 for a 4:2:2 downsampling ratio scheme (meaning that an MCU is a 16×8 pixel block). Rotation of the image has two noticeable results. First, dummy pixel blocks must be introduced when the image is rotated 90° or 270° in order to maintain completeness of the MCUs (see images B and C). Second, the Y component pixel blocks 1-40 are encoded in different pairs depending on the rotation of the image. In the non-rotated image A, Y component pixel blocks 1 and 2 are encoded within a 16×8 MCU, with block 2 being differentially encoded based on block 1. Similarly, blocks 9 and 10 are encoded in tandem in image A. However, for an image B with a 90° rotation, blocks 17 and 9 are encoded as a pair. In an image D with a 180° rotation, although blocks 1 and 2 are encoded as a pair again, the blocks 1, 2 are encoded in a different order.

Figure 4:
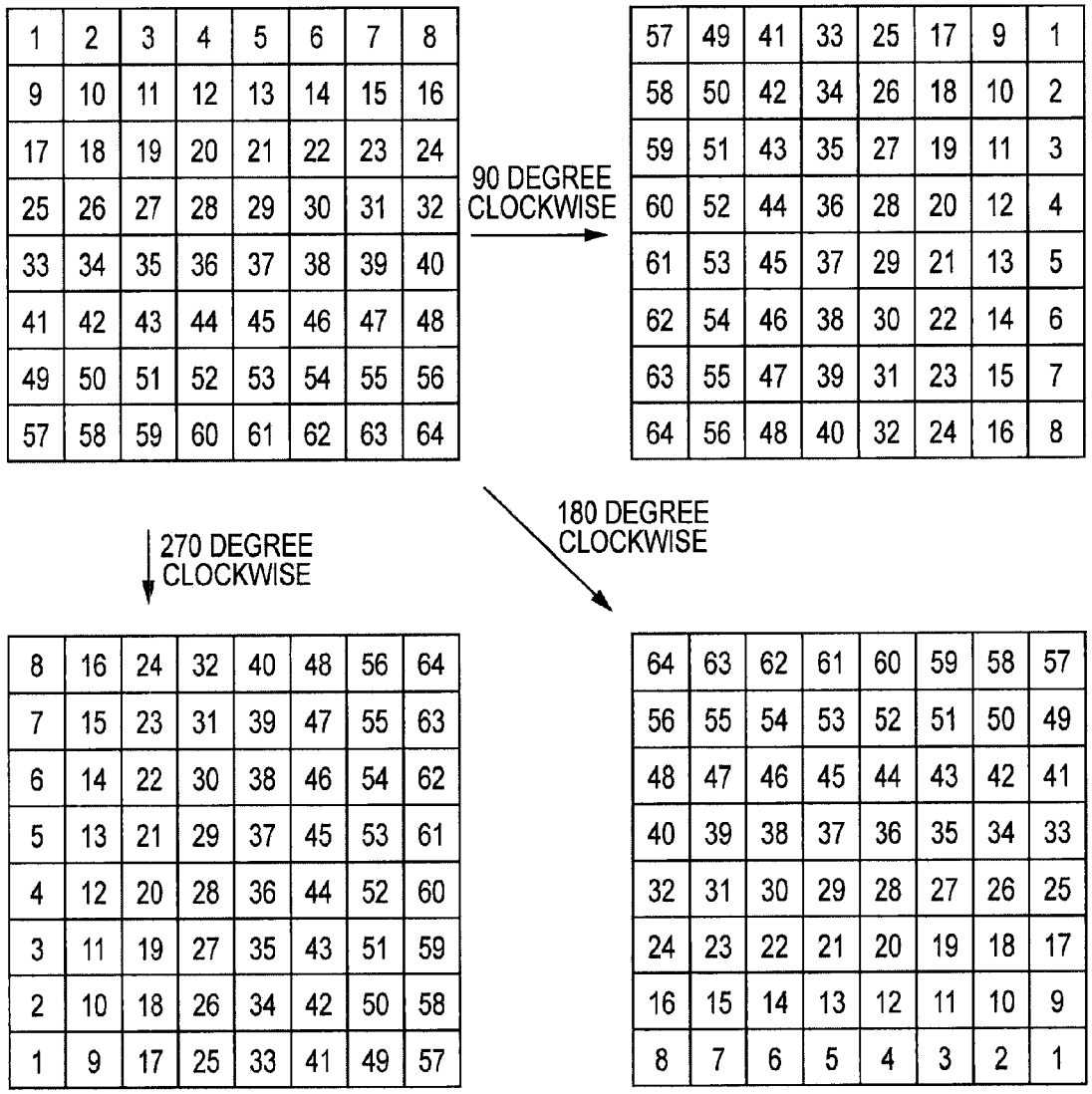
FIG. 4 illustrates the rotation of pixels in an 8×8 pixel block.

Additionally, as illustrated in FIG. 4, pixels corresponding to each component pixel block in an MCU are also rotated into a different order when the image is rotated. An 8×8 component pixel block that is rotated 90°, 180° or 270° will have a different pixel sequence than that of the un-rotated 8×8 component pixel block. This rotation within each component pixel block within each MCU must also be accounted for.

Figure 5:
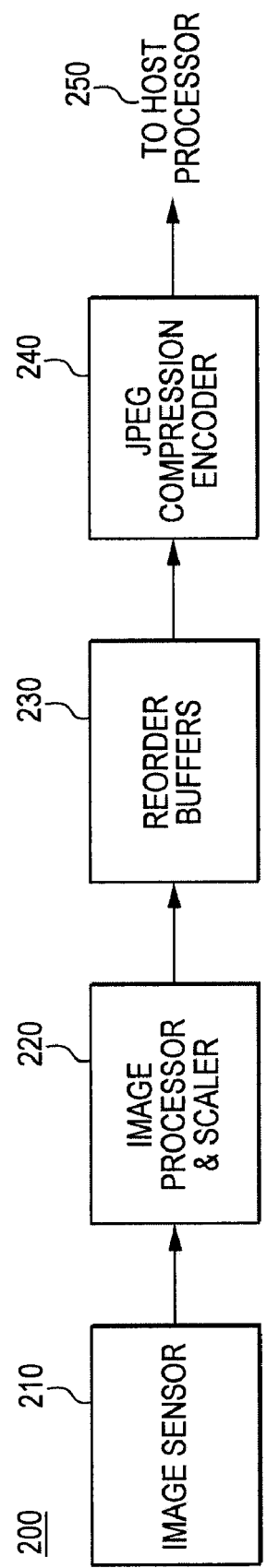
FIG. 5 is a block diagram of an image rotation operation in a JPEG compression pipeline according to a disclosed embodiment.

A system 200 that successfully rotates image data for acquired images and that overcomes the challenges of JPEG domain rotation as described above is illustrated in FIG. 5. The system 200 may be used to rotate acquired images during the JPEG compression process, with some steps occurring before the image is JPEG compressed and with some steps occurring after compression. The system 200 includes an image sensor 210, an image processor and scaler 220, reorder buffers 230, and a JPEG compression encoder 240. The resulting compressed bitstream is transmitted to a host processor 250.

The system 200 is described first in relation to acquisition of an image. An image may be acquired using, for example, a digital still-image camera. When a camera is held vertically to capture a tall object, the resulting image appears to have undergone a 90° rotation with respect to the same picture taken with the camera held horizontally. To correct for this, system 200 provides a system and method to compress and store the rotated image. The rotation only utilizes the memory required for JPEG compression; no additional memory is necessary.

Figure 6:
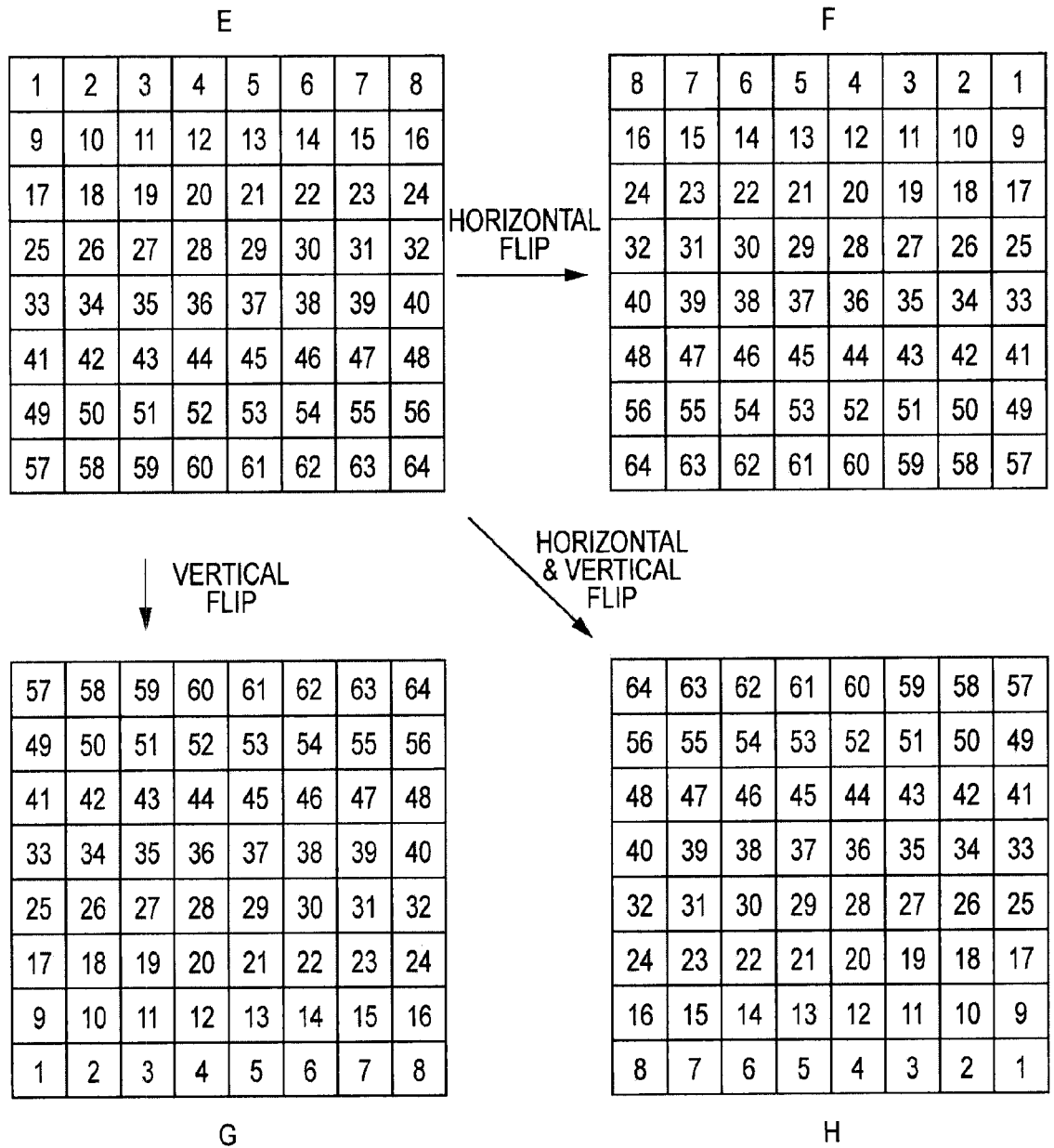
FIG. 6 illustrates multiple output modes of an image sensor according to a disclosed embodiment.

The image sensor 210 of system 200 is configured to read out pixel data using multiple read out modes. In addition to a normal readout mode where pixel values are read out from top to bottom and from left to right in order to produce an image with normal orientation, the image sensor 210 can also read out pixels in a vertical flip mode, a horizontal flip mode, and a combination vertical/horizontal flip mode. The effect of the different readout modes is illustrated in FIG. 6. FIG. 6 illustrates a numbered grid as it would be read out in the different modes. The numbered grid could represent numbered pixel outputs. The vertical flip mode output G is equivalent to the output of the normal mode E flipped in the vertical direction. The horizontal flip mode output F is equivalent to the output of the normal mode E flipped in the horizontal direction. The combination vertical/horizontal flip mode output H is the result of both the horizontal and vertical flipping modes being applied to the output E of the normal mode. The combination vertical/horizontal flip mode results in a same readout orientation as would result from rotating the normal output by 180°. As is explained below, for a 90° and a 180° rotation, both horizontal and vertical flips are utilized. For a 270° rotation, normal readout mode is utilized.

Data output from the image sensor 210 is input to the image processor and scaler 220. The image processor and scaler 220 is able to determine which output mode the image sensor 210 is using. This determination is done through a recognition of the orientation of the Bayer pattern resulting from the pixel block orientation. FIGS. 7A-7D illustrate the Bayer pattern orientations that results from each image sensor output mode. Once the image processor and scaler 220 recognizes the image orientation, the image processor and scaler 220 are able to convert the image sensor output from the Bayer format to an RGB color scheme and then to a YCbCr color scheme. The scaler part of the image processor and scaler 220 is used to downsample the chroma components after conversion to the YCbCr color scheme.

The reorder buffers 230 collect the incoming pixel data from the image processor and scaler 220 in raster scan format (meaning one row at a time) and read the pixel components out to the JPEG encoder in 8×8 blocks. Multiple reorder buffers are used because of the multiple component channels (i.e., Y, Cb and Cr component channels). Each reorder buffer 230 need only be able to store 8 lines of data at a time (as opposed to the entire image as is typically required for bitmap rotation). In order to accomplish image rotation, the orientation of the output 8×8 pixel blocks must match the rotated image. As a result, the way in which the pixel data is read from the reorder buffer 230 to the JPEG encoder 240 must be adjusted accordingly. FIGS. 8A-D illustrate diagrams that show the read order of the reorder buffer 230 for Y component data. For un-rotated (FIG. 8A) and 180° rotation (FIG. 8D), normal raster scan readout is used, with readout starting with the top left 8×8 Y component pixel block and proceeding to the right, row-by-row. For 90° (FIG. 8B) or 270° (FIG. 8C) rotations, readout begins at the top right 8×8 Y component pixel block and proceeds downwards in a column-by-column pattern.

Figure 9:
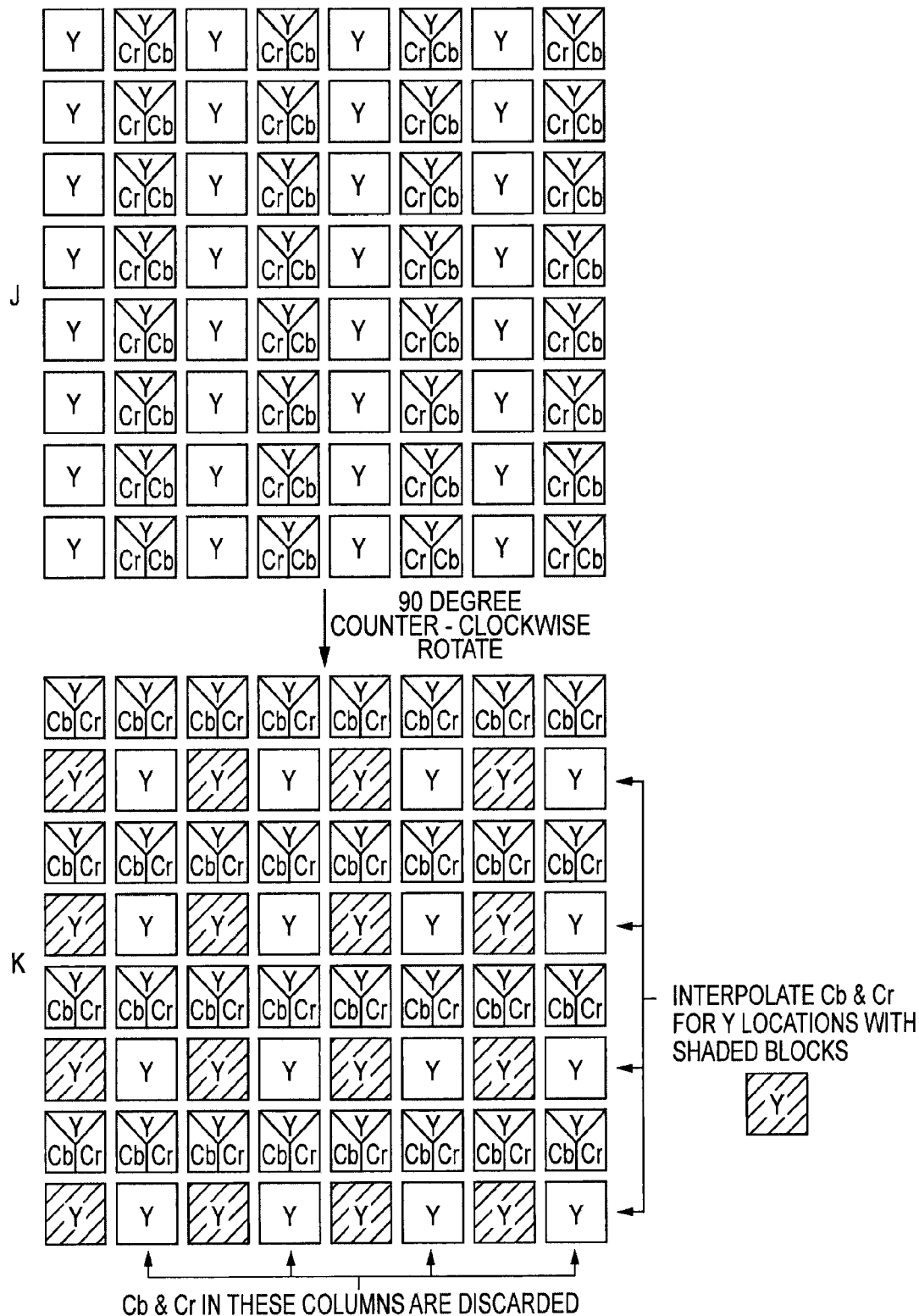
FIG. 9 illustrates chroma component block rotation according to a disclosed embodiment.

For Cb and Cr component data, the read order is the same as for Y component data. However, additional steps are necessary for a 90° or 270° rotation to account for the fact that the chroma components have been downsampled. FIG. 9 illustrates the challenge of rotating a block of pixels that has been downsampled. In the un-rotated pixel block J, every other pixel column includes chroma components. However, when the pixel block is rotated (block K), the chroma components are no longer spatially organized as they would be in a 4:2:2 downsampled ratio scheme. To account for this change, some chroma component values are discarded as the chroma pixel blocks are read into the reorder buffer. Specifically, every other value is deleted. When the blocks are read out, additional chroma component values are interpolated from neighboring Cb and Cr component locations.

Once pixel data is sent from the reorder buffers 230 to the JPEG encoder 240, the JPEG encoder 240 carries out the rest of the normal JPEG compression steps such as DCT, quantization, and differential and entropy encoding. However, depending on the degree of rotation applied to the image, the pixel blocks may not be in the proper order for differential encoding. Pixel blocks sent from the reorder buffers 230 for an non-rotated image or for an image rotated by 180° are in the correct order, and no additional processing steps need occur apart from normal JPEG encoding. However, if the image has been rotated by 90° or 270°, the rotated pixel blocks are not in the correct order for differential encoding, as explained below.

For images that have been rotated by 90° or 270°, the top row of pixel blocks to be input to the JPEG encoder 240 is made up of the pixel blocks that will constitute the first pixel block column of the rotated image. The first pixel block read into the JPEG encoder 240 will be the bottom-left pixel block of the rotated image. The second pixel block read into the JPEG encoder 240 will be the pixel block located just above the first pixel block in the rotated image. The last pixel block of the first row of pixel blocks read into the JPEG encoder 240 will be the top-left pixel block of the rotated image. Because the differential encoding applied by the JPEG encoder 240 is row-wise, the DC coefficients of each pixel block from the top pixel block row (i.e., the first pixel block column in the rotated image) may be calculated and stored by the JPEG encoder 240 for use as predictor values for the DC coefficients of respective pixel blocks that are read-in at a later time to be used in the second pixel block column of the rotated image. Once differential encoding has been completed for the second pixel block column, the temporarily stored DC coefficients for the first pixel block column may be replaced by the DC coefficients of the second pixel block column so that they may be used as predictor values for the third pixel block column. In this way, entire rotated pixel block rows may be differentially encoded using a single embedded memory for each set of component pixel blocks (Y, Cb and Cr components). The size of the embedded memory is equal to the image width divided by eight (the number of pixels in each pixel block) multiplied by the number of bits needed to store the DC coefficients (e.g., 11 bits per DC coefficient). If the restart interval is set to one MCU, then embedded memory is only required for the Y component pixel blocks (since the DC coefficients for the Cb and Cr component pixel blocks will each be independently calculated). An example of this process is described below in relation to FIGS. 10-13.

The differential encoding process described above requires the host processor 250 to perform some bit-wise data re-arrangement but it does not affect any other aspects of the JPEG encoding process (e.g., the process does not require any Huffman decoding or encoding operations). The process avoids adding additional line buffers to the system yet maintains the maximum output image size from the pipeline 200.

The JPEG encoder 240 also provides information for a Reconstruction Index Table ("RIT") that is used by the host processor 250 to reconstruct a rotated image from a collection of rotated pixel blocks. The RIT entries identify a starting address and a data size for each Y, Cb and Cr component block after compression. Based on the degree of image rotation, the host processor 250 can use the information from the RIT to calculate a correct memory offset required during a reconstruction phase. Reconstruction of an MCU requires that the host processor 250 identify the location and data size of the two Y component blocks and the Cb and Cr blocks of each MCU. Then, the host processor 250 can read out the identified data from the system memory, combine them into an MCU and write it to a different memory location. The reconstruction of the rotated JPEG image is accomplished by repeating this process until all MCUs in the image have been reconstructed.

To avoid adding excessive amounts of embedded memory to the system, RIT entries are sent from the JPEG encoder 240 to the host processor 250 in sections intermixed with the JPEG data. Each section of the RIT comprises the data size of every component block in one block row. The host processor 250 extracts RIT information from the JPEG encoder 240 output and stores the RIT data separately from the JPEG compressed data. Before MCUs may be reconstructed, it is necessary that the host processor 250 receive all MCUs from the same JPEG frame as well as the complete RIT.

An example of the pipeline as applied to an image is illustrated in FIGS. 10-13. The example is applied to an image of arbitrary size. If, as a result of the image size, dummy component blocks are necessary to complete the MCUs, these are created by the JPEG encoder in the normal JPEG encoding process. In the examples, the image is not rotated in FIG. 10, rotated 270° in FIG. 11, rotated 90° in FIG. 12, and rotated 180° in FIG. 13. In FIGS. 10-13, arrows are used for convenience to represent the blocks identified in FIG. 5, as explained below.

Figure 10:
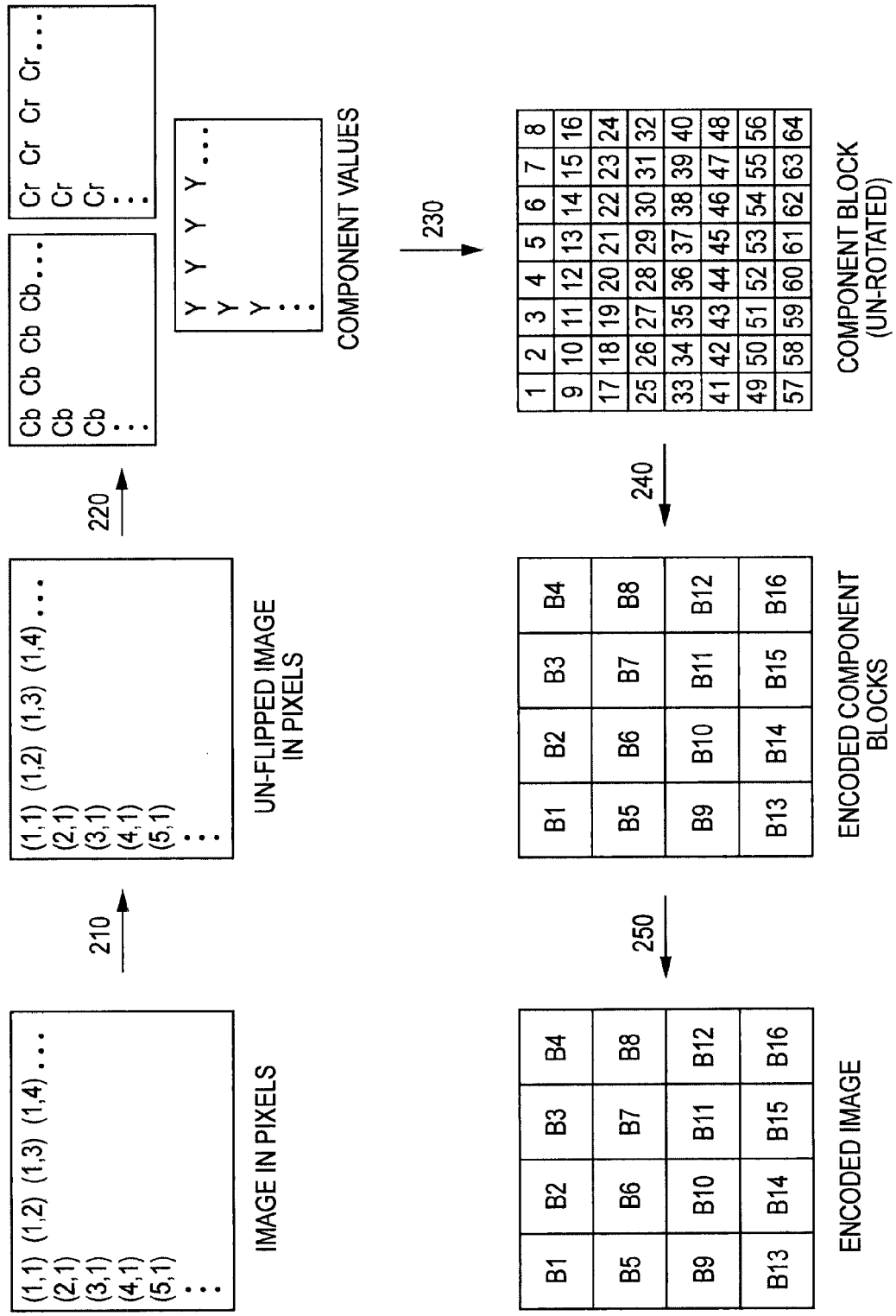
FIG. 10 illustrates an example of how an un-rotated image is processed by the FIG. 5 pipeline according to a disclosed embodiment.

In FIG. 10, the un-rotated image with pixels (1,1), (2,1), etc., is output by the image sensor 210 with no flipping. The unrotated image is then input to the image processor and scaler 220 where it is converted from Bayer format to RGB format to YCbCr format. Downsampling may also occur in the image processor and scaler 220. The image processor and scaler 220 outputs component values to the reorder buffers 230. The reorder buffers 230 output 8×8 component blocks. In this case, no re-ordering of the component values 1, 2, 3, etc., that make up the component blocks B1, B2, B3, etc., is done (i.e., no block rotation occurs). The 8×8 component blocks are input to the JPEG encoder 240 where they are processed normally. No DC coefficients need be temporarily stored because the component blocks are already in the correct order. Although an RIT may be generated, it is not used by the host processor 250 to reconstruct MCUs because no rotation has occurred. After JPEG encoding, the resulting JPEG compressed image is stored by the host processor 250.

Figure 11:
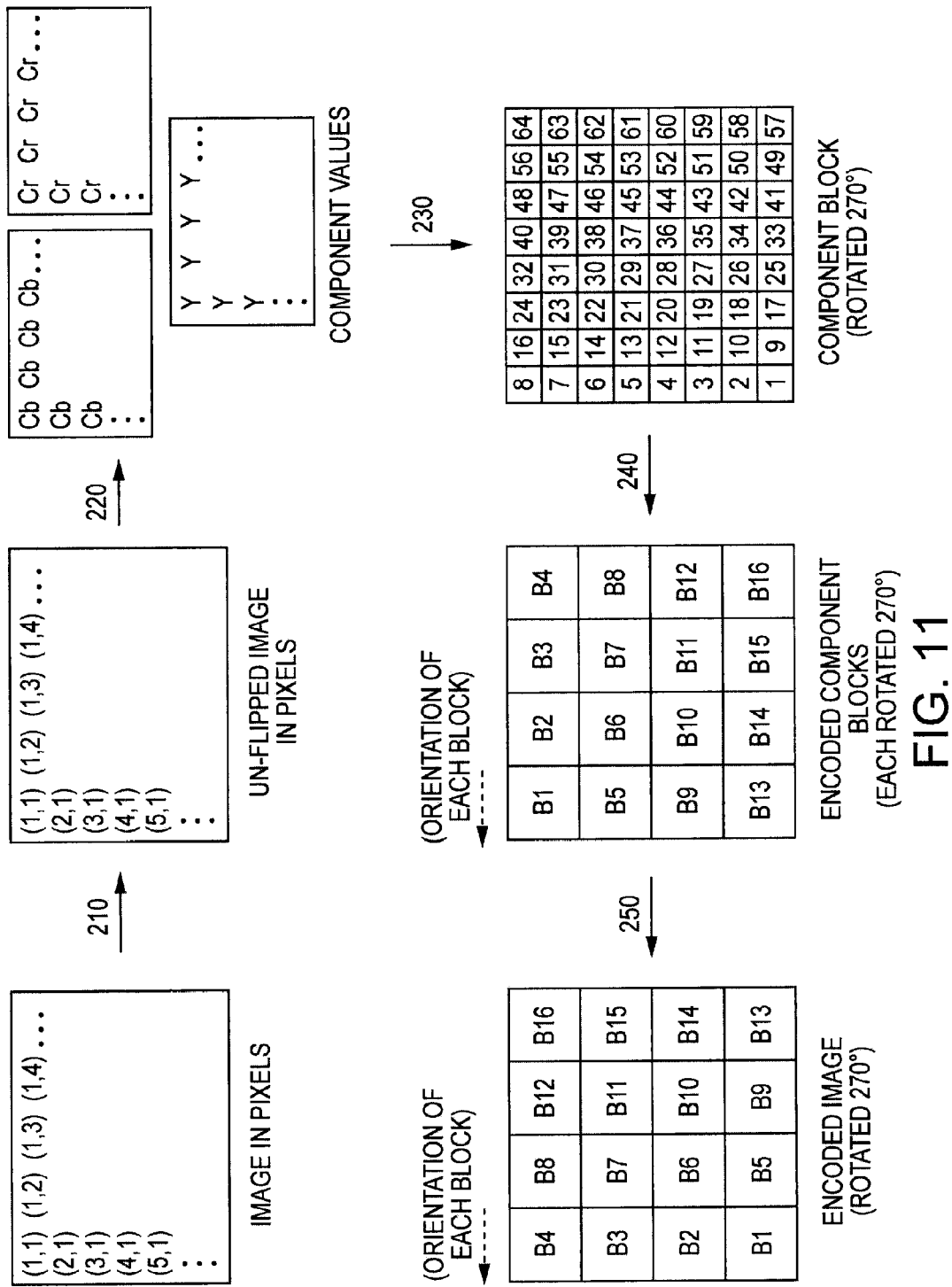
FIG. 11 illustrates an example of how an image that is rotated by 270° is processed by the FIG. 5 pipeline according to a disclosed embodiment.

An example of an image that is rotated by 270° is illustrated in FIG. 11. For an image that is to be rotated 270°, the acquired image is also output by the image sensor 210 with no flipping. The image is processed by the image processor and scaler 220. The resulting component values are input to the reorder buffers 230. In this case, the reorder buffers 230 output 8×8 component blocks by re-ordering or rotating the blocks 270°. For the Cb and Cr component blocks, some Cb and Cr component values are deleted while others are interpolated. The rotated component blocks are input to the JPEG encoder 240, which encodes the blocks, calculates DC coefficients for temporary storage to be used in differential encoding, and creates an RIT. The JPEG compressed blocks are reconstructed by the host processor 250 using the RIT.

Figure 12:
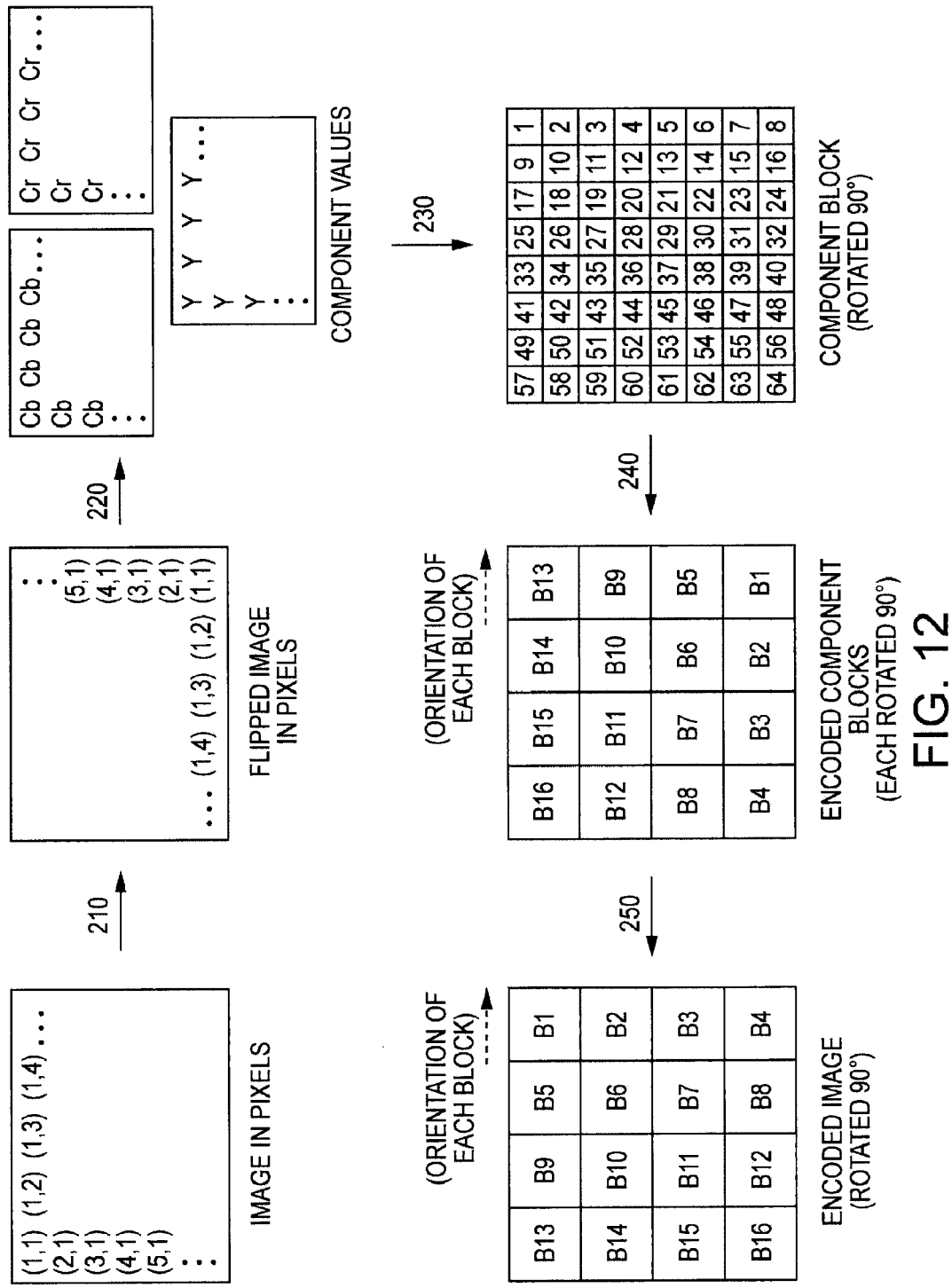
FIG. 12 illustrates an example of how an image that is rotated by 90° is processed by the FIG. 5 pipeline according to a disclosed embodiment.

An example of an image that is rotated by 90° is illustrated in FIG. 12. For an image that is to be rotated 90°, the acquired image is output by the image sensor 210 with both horizontal and vertical flipping. The image is processed by the image processor and scaler 220. The resulting component values are input to the reorder buffers 230. In this case, the reorder buffers 230 output 8×8 component blocks by re-ordering or rotating the blocks 90°. For the Cb and Cr component blocks, some Cb and Cr component values are deleted while others are interpolated. The rotated component blocks are input to the JPEG encoder 240, which encodes the blocks, calculates DC coefficients for temporary storage to be used in differential encoding, and creates an RIT. The JPEG compressed blocks are reconstructed by the host processor 250 using the RIT.

Figure 13:
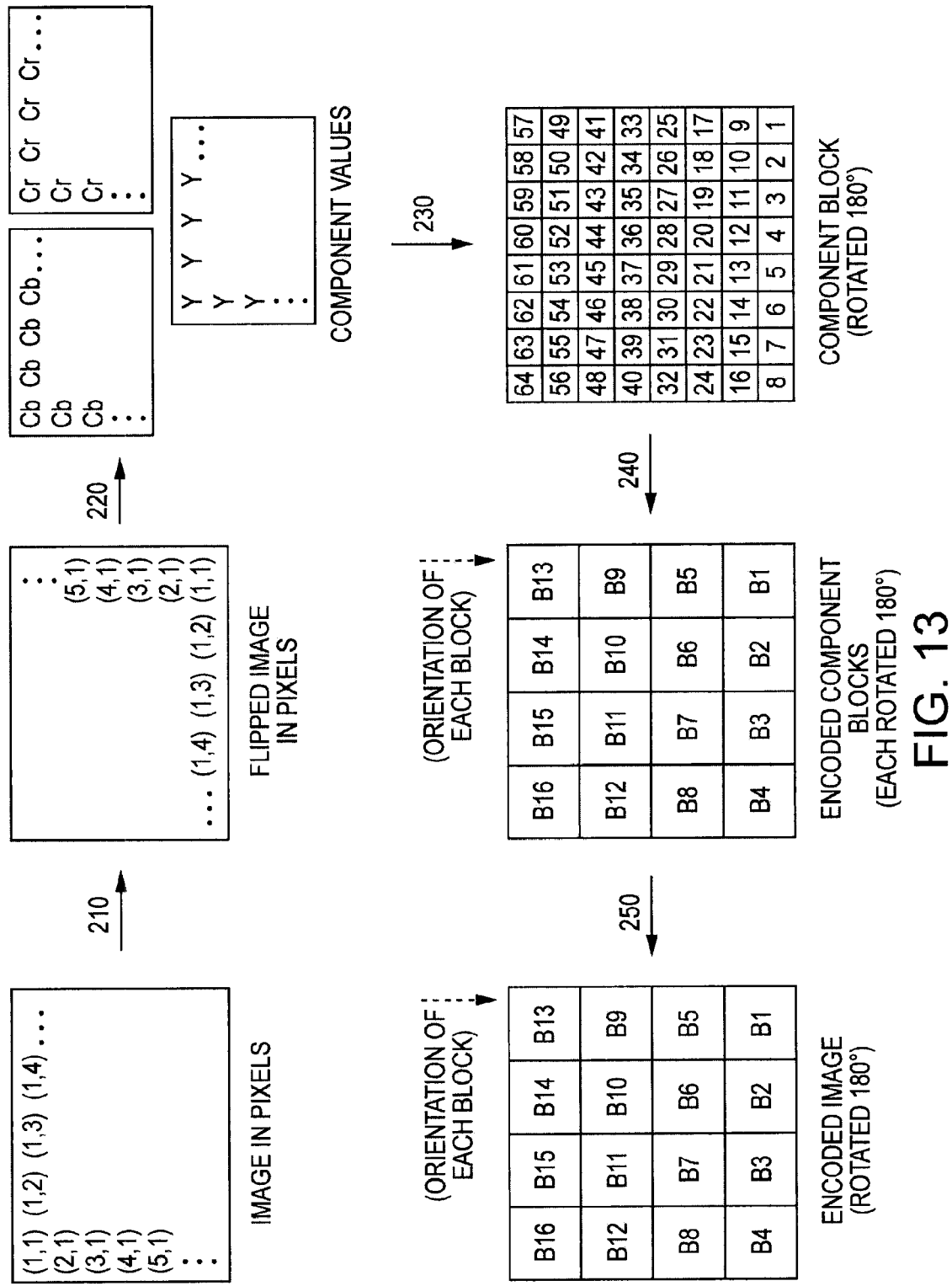
FIG. 13 illustrates an example of how an image that is rotated by 180° is processed by the FIG. 5 pipeline according to a disclosed embodiment.

An example of an image that is rotated by 180° is illustrated in FIG. 13. For an image that is to be rotated 180°, the acquired image is also output by the image sensor 210 with horizontal and vertical flipping. The image is processed by the image processor and scaler 220. The resulting component values are input to the reorder buffers 230. The reorder buffers 230 do not actually rotate the output 8×8 blocks, in this case, as the blocks have already been rotated 270° through the image sensor flipping process. The component blocks are input to the JPEG encoder 240, which encodes the blocks. Temporary storage of DC coefficients is not necessary. Although an RIT may be generated, it is not used by the host processor 250 to reconstruct MCUs because the component blocks are already in the correct order. After JPEG encoding, the resulting JPEG compressed image is stored by the host processor 250.

The image rotation JPEG compression pipeline 200, as described above, may be implemented using hardware alone, a combination of hardware and software, or via software alone. As mentioned above, images may be acquired using either a CMOS or CCD image sensor. Other image sensors may also be compatible with the pipeline 200. In addition, the pipeline 200 may be used in any imaging system which employs an imager device, including, but not limited to a computer system, camera system, scanner, machine vision, vehicle navigation, video telephone, surveillance system, automatic focus system, star tracker system, motion detection system, image stabilization system, and other imaging systems. Example digital camera systems in which the embodiments may be used include digital video cameras, still cameras with video options, cellular telephone cameras, handheld personal digital assistant (PDA) cameras, and other types of cameras. The embodiments may also be used in a stand-alone image processor, such as a personal computer programmed to implement the image rotation JPEG compression pipeline 200 process.

Figure 14:
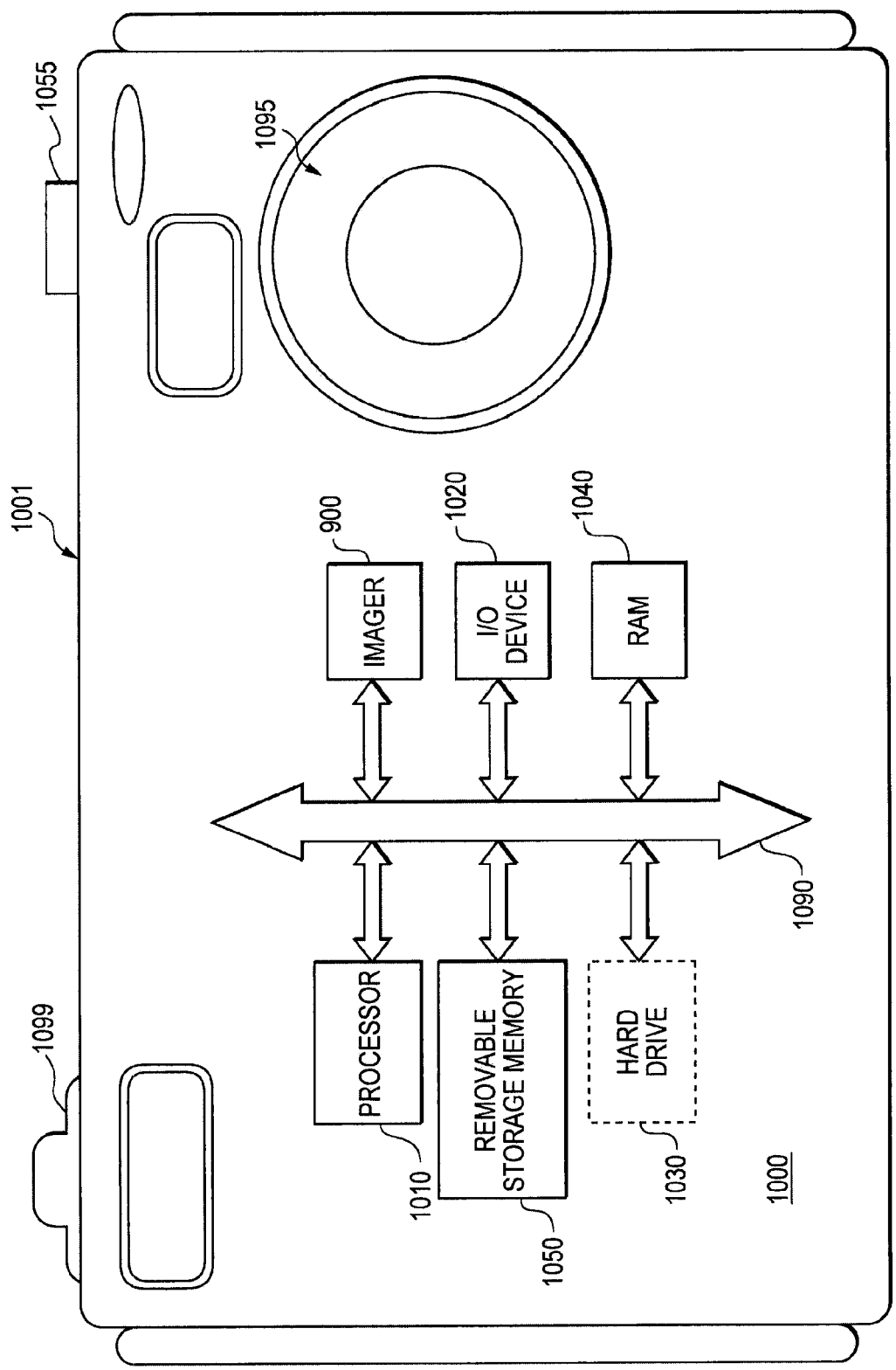
FIG. 14 is a block diagram of an imaging system according to a disclosed embodiment.

FIG. 14 shows a typical system 1000 which is part of a digital camera 1001. The system 1000 includes an imaging device 900, which includes software and hardware to implement the image rotation JPEG compression pipeline 200 in accordance with the embodiments described above. System 1000 generally comprises a processing unit 1010, such as a microprocessor, that controls system functions and which communicates with an input/output (I/O) device 1020 over a bus 1090. Imaging device 900 also communicates with the processing unit 1010 over the bus 1090. The system 1000 also includes random access memory (RAM) 1040, and can include removable storage memory 1050, such as flash memory, which also communicates with the processing unit 1010 over the bus 1090. Lens 1095 focuses an image on a pixel array of the imaging device 900 when shutter release button 1099 is pressed. An indicator switch 1055 may be used by a user to indicate if and to how much an acquired image should be rotated by the system 1000. Alternatively, the system 1000 may include automatic sensing equipment (such as a gyroscope, for example) to determine if acquired images should be rotated. Automatic image rotation could also be the default option in system 1000.

The system 1000 could alternatively be part of a larger processing system, such as a computer. Through the bus 1090, the system 1000 illustratively communicates with other computer components, including but not limited to, a hard drive 1030 and one or more removable storage memory 1050 devices. The imaging device 900 may be combined with a processor, such as a central processing unit, digital signal processor, or microprocessor, with or without memory storage on a single integrated circuit or on a different chip than the processor.

What is claimed as new and desired to be protected by Letters Patent of the United States is:

1. A method of rotating a digital image a desired rotation of either 90°, 180° or 270°, the method comprising:
    if the desired rotation is a 90° or 180° rotation, flipping the image vertically and horizontally;
    dividing the image into blocks of pixels;
    rotating the pixel blocks the desired rotation;
    encoding the rotated pixel blocks, wherein if the desired rotation is either 90° or 270°, differential encoding of frequency-domain coefficients is performed by using frequency-domain coefficients for each rotated pixel block in a row of rotated pixel blocks to differentially encode the frequency-domain coefficients for each rotated pixel block in a subsequent row of rotated pixel blocks; and
    mapping the encoded rotated pixel blocks to a storage location for the desired rotated image.

2. The method of claim 1, wherein the digital image is in a Bayer format prior to the flipping step.

3. The method of claim 2, further comprising converting the digital image from a Bayer format to a YCbCr format after the flipping step and before the dividing step.

4. The method of claim 3, wherein the converting step further comprises determining from the Bayer pattern if the digital image has been flipped.

5. The method of claim 1, wherein the rotating step further comprises reading out pixels from the pixel blocks according to a first read-out pattern if the desired rotation is 180°.

6. The method of claim 5, wherein the rotating step further comprises reading out pixels from the pixel blocks according to a second read-out pattern if the desired rotation is 90° or 270°.

7. The method of claim 1, wherein the differentially encoded frequency-domain coefficients include DC coefficients.

8. The method of claim 7, wherein DC coefficients for each rotated pixel block in a row of rotated pixel blocks are temporarily stored in an embedded memory.

9. The method of claim 1, wherein the mapping step further comprises creating an index that tracks the size and starting memory location of each of the encoded rotated pixel blocks.

10. The method of claim 9, wherein the index is transferred to a host as embedded data.

11. The method of claim 10, wherein the host uses the index and the encoded pixel blocks to reconstruct and store the encoded rotated digital image.

12. The method of claim 1, wherein the blocks of pixels are 8×8 pixel blocks.

13. A method of acquiring and storing a rotated digital image, the method comprising:
    acquiring a digital image;
    for a desired rotation of 90° or 180°, flipping the digital image;
    converting the digital image into the 4:2:2 YCbCr color space with YCbCr components;
    dividing the YCbCr components into 8×8 component blocks;
    encoding the component blocks using JPEG standard compression, wherein if the desired rotation is either 90° or 270°, differential encoding of frequency-domain coefficients is performed by using frequency-domain coefficients for each component block in a row of component blocks to differentially encode the frequency-domain coefficients for each component block in a subsequent row of component blocks; and
    mapping the encoded component blocks to a storage location for the desired rotated image.

14. The method of claim 13, wherein the dividing step further comprises incrementally reading the component values into respective 8-line buffers.

15. The method of claim 14, wherein the reading-in step comprises deleting every other Cb and Cr value in a Cb or Cr component block when the desired rotation is either 90° or 270°.

16. The method of claim 15, wherein the dividing step further comprises reading-out the buffered component values into 8×8 component blocks, wherein the component values are read-out column-by-column when the desired rotation is either 90° or 270°.

17. The method of claim 16, wherein the reading-out step comprises interpolating a column of Cb or Cr component values after each column of a Cb or Cr component block is read-out when the desired rotation is either 90° or 270°.

18. A JPEG compression pipeline for rotating a digital image by 90°, 180° or 270°, the pipeline comprising:
    an image sensor that is configured to horizontally and vertically flip an acquired digital image upon receiving an indication that the acquired digital image is to be rotated either 90° or 180°;
    an image processor to convert the flipped image to YCbCr component values;
    one or more reorder buffers to organize and rotate component blocks of component values; and
    a JPEG encoder that inputs and JPEG encodes the rotated component blocks, wherein if the rotation is either 90° or 270°, the JPEG encoder differentially encodes DC coefficients of the component blocks by using DC coefficients for each rotated component block in a row of rotated component blocks to differentially encode the DC coefficients for each respective rotated component block in a subsequent row of rotated component blocks, the JPEG encoder also generating an index to map the encoded rotated pixel blocks to a storage location for the JPEG encoded rotated image.

19. The pipeline of claim 18, wherein the image processor is configured to identify if an input Bayer pattern image received from the image sensor has been flipped.

20. The pipeline of claim 18, wherein the one or more reorder buffers are configured to read-out component values from the component blocks according to a first read-out pattern if the desired rotation is 180°.

21. The pipeline of claim 20, wherein the one or more reorder buffers are configured to read-out component values from the component blocks according to a second read-out pattern if the desired rotation is 90° or 270°.

22. The pipeline of claim 18, wherein the JPEG encoder temporarily stores the DC coefficients for each rotated component block in a row of rotated component blocks in an embedded data.

23. The pipeline of claim 18, wherein the index generated by the JPEG encoder includes data for the size and starting memory location of each of the encoded rotated component blocks.

24. The pipeline of claim 18, further comprising a host processor which uses the index and encoded component blocks generated by the JPEG encoder to reconstruct and store the rotated digital image.

25. An imaging system for rotating images, the system comprising:
   an image sensor that is configured to horizontally and vertically flip an acquired digital image upon receiving an indication that the acquired digital image is to be rotated either 90° or 180°;
   an image processor that converts the digital image into the 4:2:2 YCbCr color space;
   one or more reorder buffers to organize and rotate 8×8 component blocks of component values;
   a JPEG encoder that inputs and JPEG encodes the rotated 8×8 component blocks, wherein if the rotation is either 90° or 270°, the JPEG encoder differentially encodes DC coefficients of the component blocks by using DC coefficients for each rotated component block in a row of rotated component blocks to differentially encode the DC coefficients for each respective rotated component block in a subsequent row of rotated component blocks, the JPEG encoder also generating an index to map the encoded rotated pixel blocks to a storage location for the JPEG encoded rotated image; and
   a host processor that utilizes the encoded component blocks and the index to reconstruct and store the rotated JPEG image.

26. The system of claim 25, wherein the one or more reorder buffers comprises 8-line buffers used to incrementally read-in the component values.

27. The system of claim 26, wherein the reorder buffers used to generate Cb and Cr component blocks delete every other Cb and Cr value as the Cb or Cr component values are read-into the reorder buffers if the rotation is either 90° or 270°.

28. The system of claim 25, wherein the reorder buffers read-out component values column-by-column when the desired rotation is either 90° or 270°.

29. The system of claim 28, wherein the reorder buffers used to generate Cb and Cr component blocks interpolate a column of Cb or Cr component values after each column of a Cb or Cr component block is read-out when the desired rotation is either 90° or 270°.

30. A digital camera able to rotate and store acquired images in JPEG compressed form, the camera comprising:
   an indicator that indicates that an acquired image is to be rotated either 90°, 180° or 270°;
   an image sensor configured to horizontally and vertically flip an acquired digital image upon receiving an indication that the acquired digital image is to be rotated either 90° or 180°;
   an image processor that converts the digital image into the YCbCr color space;
   one or more reorder buffers to organize and rotate 8×8 component blocks of component values;
   a JPEG encoder that inputs and JPEG encodes the rotated 8×8 component blocks, wherein if the rotation is either 90° or 270°, the JPEG encoder differentially encodes DC coefficients of the component blocks by using DC coefficients for each rotated component block in a row of rotated component blocks to differentially encode the DC coefficients for each respective rotated component block in a subsequent row of rotated component blocks, the JPEG encoder also generating an index to map the encoded rotated pixel blocks to a storage location for the JPEG encoded rotated image; and
   a host processor that utilizes the encoded component blocks and the index to reconstruct and store the rotated JPEG image.

31. The digital camera of claim 30, wherein a user indicates that the acquired image is to be rotated.

32. The digital camera of claim 30, wherein the indication that the acquired image is to be rotated is automatic.

33. The digital camera of claim 30, wherein the one or more reorder buffers are configured to read-out component values from the component blocks row-by-row if the indicated rotation is 0° or 180°.

34. The digital camera of claim 30, wherein the one or more reorder buffers are configured to read-out component values from the component blocks column-by-column if the indicated rotation is 90° or 270°.

35. The digital camera of claim 30, wherein the memory used to rotate the acquired image is limited to the reorder buffers and embedded data.

36. The digital camera of claim 35, wherein the reorder buffers are configured to store eight lines of component data from the acquired image at a time.

37. The digital camera of claim 30, wherein the index generated by the JPEG encoder includes data for the size and starting memory location of each of the encoded rotated component blocks.

* * * * *